(12) United States Patent  
Inoue

(10) Patent No.: US 7,677,224 B2
(45) Date of Patent: Mar. 16, 2010

(54) FLUID PUMP CONTROL APPARATUS

(75) Inventor: Tetsuji Inoue, Nagoya (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 30 days.

(21) Appl. No.: 12/071,874

(22) Filed: Feb. 27, 2008

(65) Prior Publication Data

US 2008/0230035 A1 Sep. 25, 2008

(30) Foreign Application Priority Data

Mar. 23, 2007 (JP) ............................. 2007-076290

(51) Int. Cl.
*F02M 37/04* (2006.01)
(52) U.S. Cl. ..................... 123/497; 123/510
(58) Field of Classification Search .................. 123/497
See application file for complete search history.

(56) References Cited

U.S. PATENT DOCUMENTS 5,883,490 A * 3/1999 Moreira ..................... 318/807
6,316,842 B1 * 11/2001 Kuroda et al. ............. 290/40 C
2004/0250792 A1 * 12/2004 Mizobuchi et al. .......... 123/322
2008/0245343 A1 * 10/2008 Graf .......................... 123/497

FOREIGN PATENT DOCUMENTS

JP    A 7-317620    12/1995

* cited by examiner

*Primary Examiner*—Stephen K Cronin
*Assistant Examiner*—Raza Najmuddin
(74) *Attorney, Agent, or Firm*—Oliff & Berridge, PLC

(57) ABSTRACT

A fuel supply system comprises an engine control unit (ECU), a fuel pump with a built-in pump motor which is PWM controlled based on a control signal from the ECU, a pump controller for controlling supply of electric power to the pump motor, and sensors for detecting an operating state of the engine. A control section of the pump controller controls to change a frequency to be lower as a duty ratio of a PWM control signal to operate a power transistor of an output circuit is higher and inversely to change the frequency to be higher as the duty ratio is lower.

3 Claims, 5 Drawing Sheets

FLUID PUMP CONTROL APPARATUS

BACKGROUND OF THE INVENTION

1. Field of the Invention

The present invention relates to a pump control apparatus for controlling operation of a motor-driven pump which is mounted on a vehicle and is PWM-controlled.

2. Description of Related Art

In a vehicle, various kinds of motor-driven pumps (fuel pump, water pump, oil pump, etc.) are mounted, operations of which are controlled by PWM control (Pulse Width Modulation Control). For instance, for achieving high-precise fuel pump control by a fuel pump control apparatus arranged to control operation of a fuel pump, a pump control signal has to be converted to a signal appropriate for actual operation of the pump. Specifically, when a low-frequency duty signal (a PWM control signal) calculated by an engine controller at every predetermined interrupt is to be output, the low-frequency duty signal is converted to a high-frequency signal by the fuel pump control apparatus. In this case, by pump driving operation based on the high-frequency signal, a pump motor is switched at high speed and at earlier intervals than the time constant (the response to a speed command) of the pump motor, thus providing a smooth operation of a fuel pump (see JP7(1995)-317620A). It is to be noted that the same control as for the fuel pump is executed on pumps such as a water pump other than the fuel pump.

In the aforementioned pump control apparatus, however, the frequency of a PWM control signal is changed to be high for achieving high-speed switching of the pump motor. This would cause a problem that the control apparatus (particularly, a drive circuit) generates high heat. For avoiding such problem, a special countermeasure for heat radiation is required.

Here, in order to avoid heat generation of the control apparatus (particularly, the drive circuit), the frequency of the PWM control signal has only to be set to be low. However, when the frequency of the PWM control signal is low, pump noise would increase (the frequency falls in an audible range).

BRIEF SUMMARY OF THE INVENTION

The present invention has an object to provide a fluid pump control apparatus capable of restraining heat generation of the control apparatus and controlling pump noise to a level which presents no practical problem.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a fluid pump control apparatus comprising: a main controller for controlling a vehicle drive source; a fluid pump internally provided with a motor to be PWM controlled based on a control signal from the main controller; a sub-controller for controlling supply of electric power to the motor of the fluid pump; and state detecting means for detecting an operating state of the vehicle drive source, wherein the sub-controller includes frequency control means for changing a frequency of the PWM control signal to control the fluid pump based on a detection result of the state detecting means.

The vehicle drive source may include, for example, an engine used alone, an engine and an electric motor used in combination, and an electric motor used alone.

According to another aspect, the present invention provides a fuel pump control apparatus comprising: a fuel tank for storing fuel; a fuel pump placed in the fuel tank to supply the fuel from the fuel tank to an engine; an engine controller arranged to control operation of the engine; a fuel pump controller arranged to PWM control supply of electric power to the fuel pump based on a control signal from the engine controller; and state detecting means for detecting a state of the engine, wherein the fuel pump controller includes frequency control means for changing a frequency of a PWM control signal for controlling the fuel pump based on a detection result of the state detecting means, and the frequency control means controls to change the frequency of the PWM control signal to be lower as output of the engine detected by the state detecting means is larger and inversely to change the frequency of the PWM control signal to be higher as the output of the engine detected by the state detecting means is smaller.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a fluid pump control apparatus embodying the present invention will now be given referring to the accompanying drawings. In the present embodiment, the present invention is applied to a fuel supply system of a hybrid electric vehicle in which an engine and an electric motor are used in combination.

Figure 1:
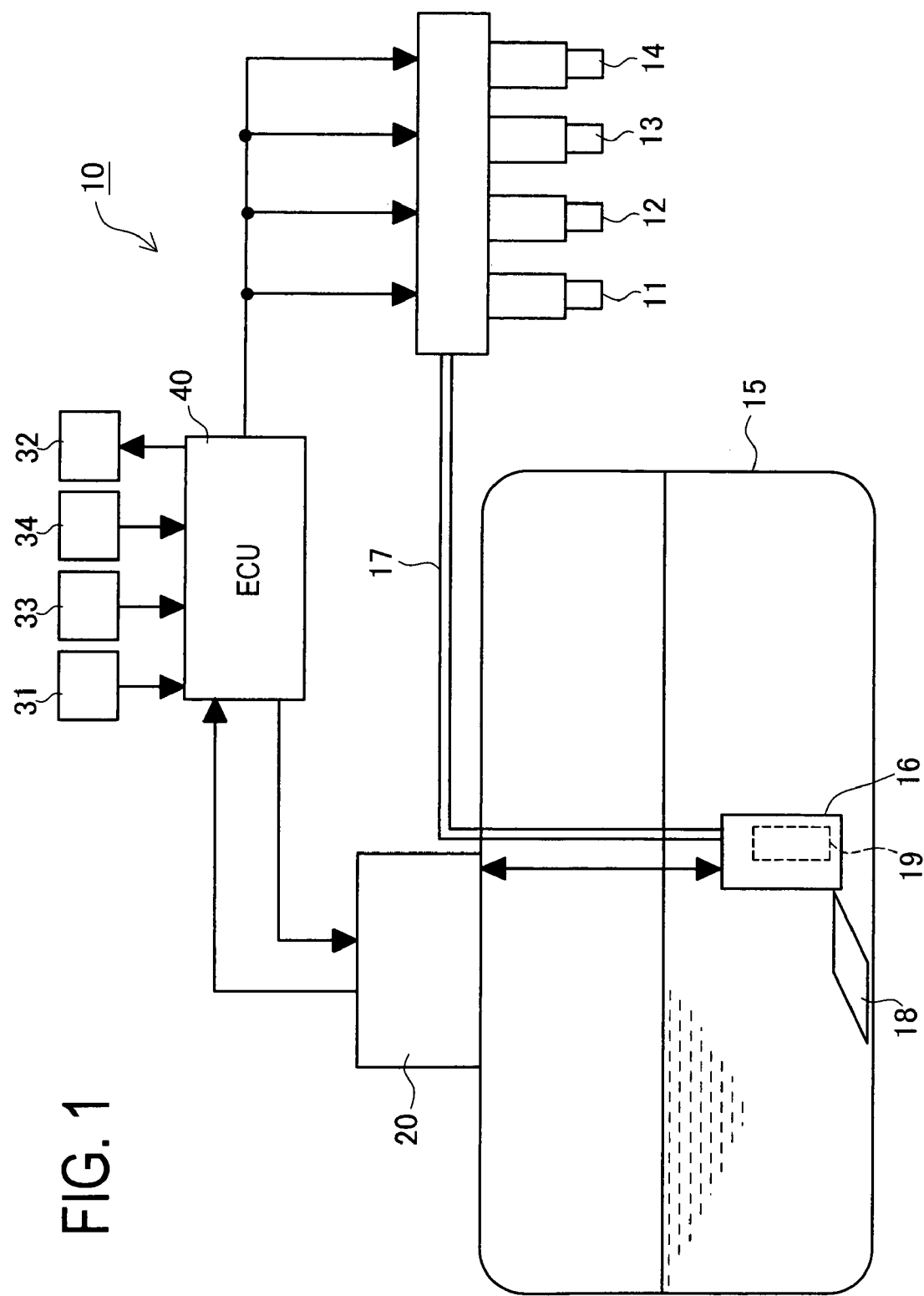
FIG. 1 is a schematic configuration view of a fuel supply system including a fluid pump control apparatus of a preferred embodiment of the present invention.

This fuel supply system will be explained below referring to FIG. 1. FIG. 1 is a schematic configuration view of the fuel supply system including a fluid pump control apparatus of the preferred embodiment. This fuel supply system 10 is arranged to supply fuel to injectors 11, 12, 13, and 14 provided in intake ports communicated with a combustion chamber of an engine not shown. In the fuel supply system 10, the fuel supplied from a fuel tank 15 to the injectors 11 to 14 via a motor-driven fuel pump 16, a fuel pipe 17, and others, is to be directly injected into the intake ports. The fuel pump 16 is provided with a pump motor 19 and built in the fuel tank 15. The fuel pump 16 is driven by the pump motor 19 to pump up the fuel stored in the fuel tank 15 to discharge the fuel into the fuel pipe 17, thus pressure-feeding the fuel to the injectors 11 to 14. This fuel pump 16 is attached with a fuel filter 18 whereby the fuel to be sucked into the fuel pump 16 is filtrated.

Here, the fuel pump 16 is connected to a pump controller 20. This pump controller 20 is arranged to control the operation of the pump motor 19 built in the fuel pump 16 and corresponds to a "sub-controller" of the present invention. When the pump motor 19 is activated by the pump controller 20, the fuel in the fuel tank 15 is pressure-fed to the injectors 11 to 14 via the fuel filter 18, the fuel pump 16, the fuel pipe 17, and others. The fuel pressure-fed to the injectors 11 to 14 is injected to the corresponding intake ports in response to operations of the injectors 11 to 14. The fuel is then mixed with intake air to form a combustible mixture to be delivered into the combustion chamber.

Figure 2:
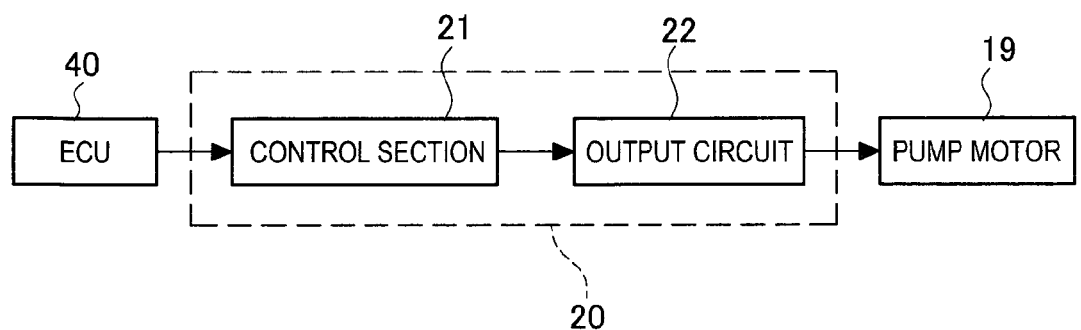
FIG. 2 is a block diagram showing a configuration of a pump controller.
Figure 3:
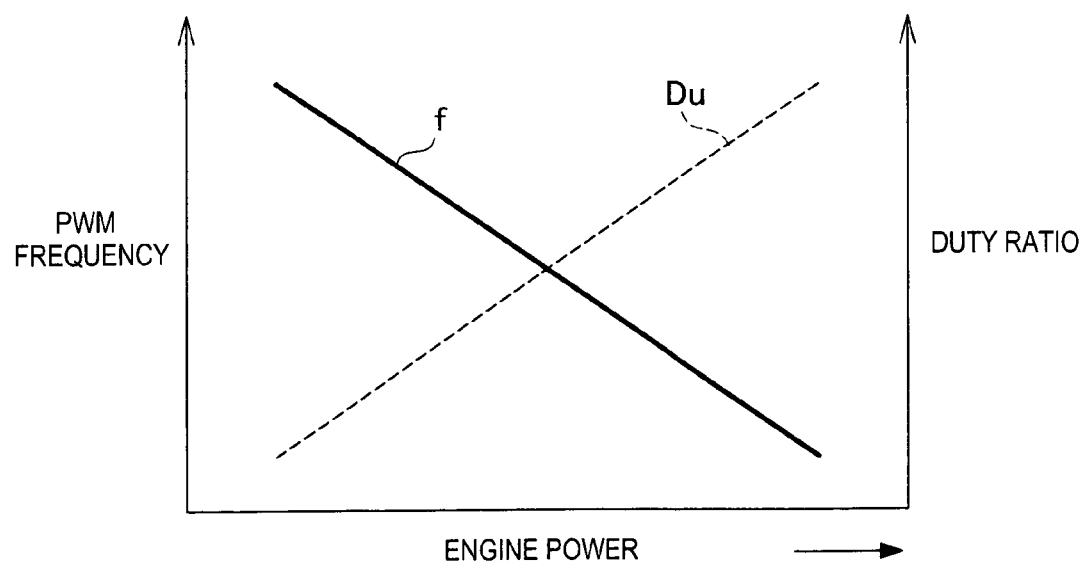
FIG. 3 is a graph showing a relationship (content of map data) between duty ratio and PWM frequency of a PWM control signal.

This pump controller 20 is, as shown in FIG. 2, provided with a control section 21 and an output circuit 22. FIG. 2 is a block diagram showing the configuration of the pump controller 20. The control section 21 is arranged to determine a PWM control signal (its duty ratio and frequency are changeable) for controlling the operation of the pump motor 19 (by PWM control) based on a command from an engine control unit 40 mentioned later. Specifically, the control section 21 corresponds to "frequency control means" of the present invention. The control section 21 therefore includes map data describing a mapped relationship between the duty ratio Du and the PWM frequency f as shown in FIG. 3. When the duty ratio Du is determined, therefore, the control section 21 determines the PWM frequency f corresponding to that duty ratio Du. To be concrete, the control section 21 sets the PWM frequency f to be lower as the duty ratio Du is higher and inversely be higher as the duty ratio Du is lower. FIG. 3 is a graph showing a relationship (content of map data) between the duty ratio and the PWM frequency of the PWM control signal.

The PWM control signal determined by the control section 21 is transmitted to the output circuit 22, and electric power is supplied from the output circuit 22 to the pump motor 19 to drive the fuel pump 16. Thus, the pump motor 19 is driven at low frequencies when the duty ratio Du is low but at high frequencies when the duty ratio Du is high.

Figure 4:
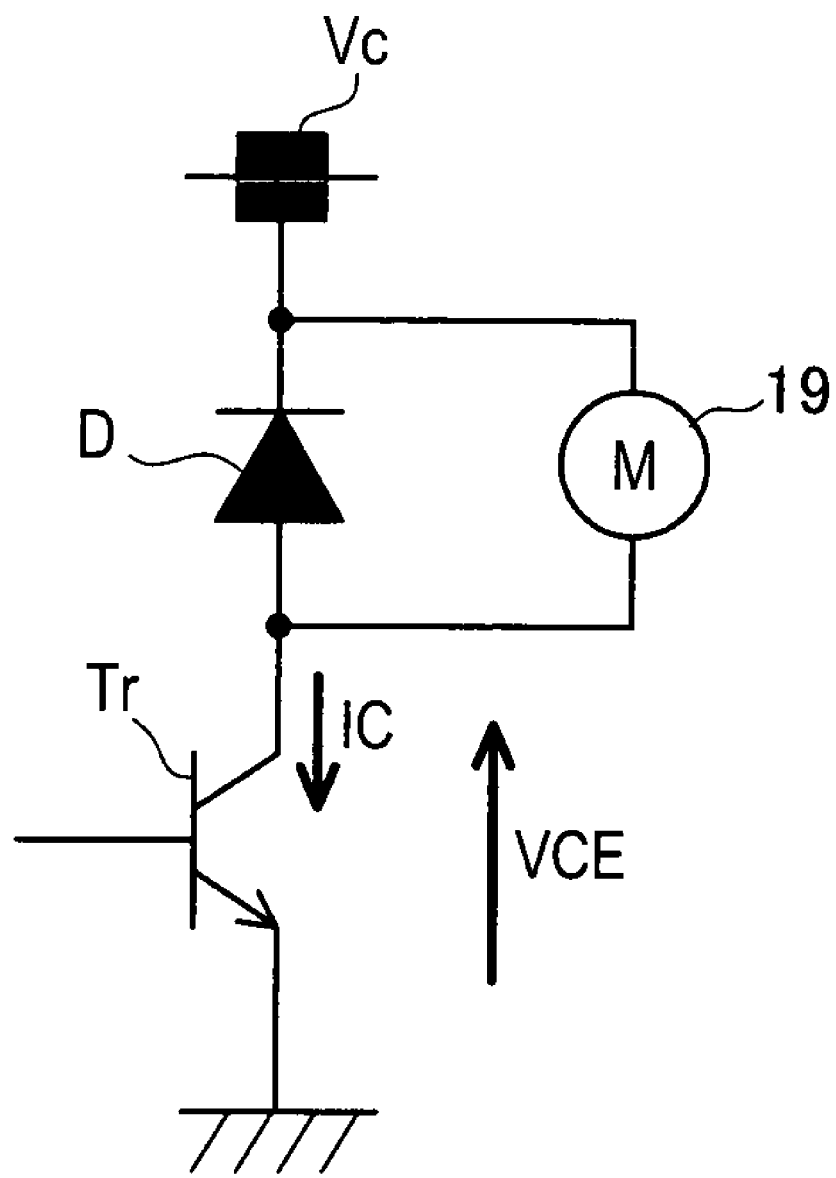
FIG. 4 is a circuit diagram of an output circuit in a pump controller.

As shown in FIG. 4, the output circuit 22 includes a power transistor Tr for driving the pump motor 19 and a diode D connected in parallel with the pump motor 19 and the output circuit 22 is connected to a power source Vc. Based on the PWM control signal (its duty ratio and frequency are changeable) generated by the control section 21 based on a command from the engine control unit 40 mentioned later, the pump controller 20 operates (switches) the power transistor Tr to control power supply to the pump motor 19. FIG. 4 is a circuit diagram of the output circuit 22 in the pump controller 20.

Such pump controller 20 is connected to the engine control unit (ECU) 40 for overall controlling the engine not shown. Various signals output from various sensors 31 such as a crank sensor are input to the ECU 40. That is, the sensors 31 correspond to "state detecting means" of the present invention. The ECU 40 detects an operating state of the engine based on those input signals to control the fuel pump 16 and the injectors 11 to 14 for execution of fuel supply control according to the operating state of the engine. It should be noted that the "fuel supply control" means controlling the discharge flow rate of the fuel pump 16 (the number of rotations of the pump motor 19), the amount of fuel to be injected (fuel injection amount) from the injectors 11 to 14 and their injection timings according to the engine operating state. Further, the ECU 40 outputs a control signal to various actuators 32 such as a throttle based on those input signals.

The ECU 40 is also connected to a vehicle-speed sensor 33 for detecting the running speed of a vehicle. Accordingly, the vehicle running speed can be input to the control section 21 of the pump controller 20 via the ECU 40. This vehicle-speed sensor 33 corresponds to "vehicle-speed detecting means" of the present invention. The ECU 40 is also connected to a low-frequency setting permission switch 34. This switch 34 is to be operated by a driver and will be turned ON to permit that the frequency of PWM control signal is set to be low for operating the transistor Tr during low-speed running. When the switch 34 is turned ON, an ON signal is input to the control section 21 of the pump controller 20 via the ECU 40. In the case where the driver turns on the switch 34, accordingly, the frequency of the PWM control signal is set to be low by the control section 21 during low-speed running of the vehicle as mentioned later.

The ECU 40 includes well known components; that is, a central processing unit (CPU), a read only memory (ROM), a random access memory (RAM), a backup RAM, an external input circuit and an external output circuit, etc. The ECU 40 constitutes a logic operation circuit in which the CPU, ROM, RAM, and backup RAM are connected to the external input circuit and external output circuit through a bus. The ROM previously stores a predetermined control program for the control of an engine. The RAM temporarily stores calculation results. The backup RAM saves the previously stored data. The CPU executes various controls in accordance with the predetermined control program based on detected values input from various sensors to the CPU through the input circuit. The ECU 40 corresponds to a "main controller" or an "engine controller" of the present invention.

Next, an explanation will be given to basic control of the fuel pump 16 (the pump motor 19) in the fuel supply system configured as above. The fuel pump 16 (the pump motor 19) is controlled by the pump controller 20 based on a command from the ECU 40. To be specific, the ECU 40 detects the engine operating state from various signals output from the sensors 31 and, according to the detected state, transmits a command signal for driving the pump motor 19 to the pump controller 20. Based on the command from the ECU 40, the control section 21 of the pump controller 20 determines a duty ratio Du for driving the pump motor 19. Further, when the duty ratio Du is determined, the control section 21 determines the PWM frequency f based on map data describing a relationship between the duty ratio Du and the PWM frequency f. At this time, the PWM frequency f is set to be lower as the duty ratio Du is higher and inversely higher as the duty ratio Du is lower as shown in FIG. 3.

The control section 21 outputs the PWM control signal representing the determined duty ratio Du and PWM frequency f to the output circuit 22, thereby switching ON/OFF the power transistor Tr. As a result, the amount of electric power to be supplied from the output circuit 22 to the pump motor 19 is controlled. This controls the number of rotations of the pump motor 19 (the discharge flow rate from the fuel pump 16) to cause the fuel pump 16 to supply an appropriate amount of fuel for the engine operating condition.

Figure 5:
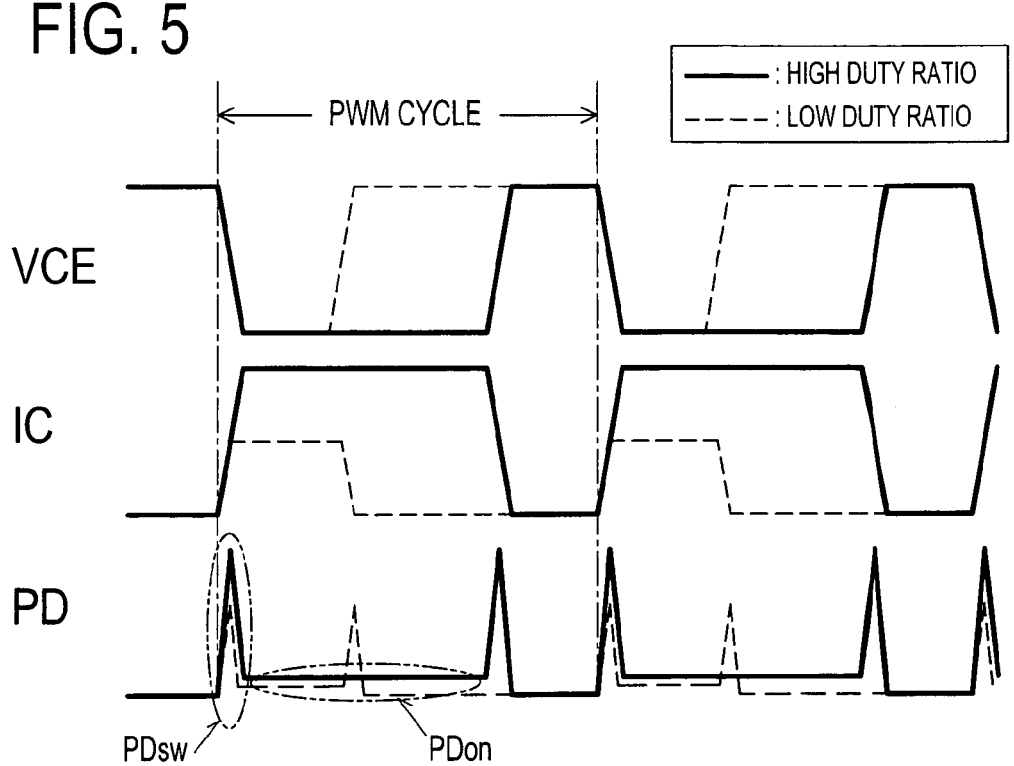
FIG. 5 is a time chart showing states of transistor voltage VCE, transistor current IC, and power transistor loss PD varying in response to ON/OFF of a power transistor Tr in the case where the PWM frequency is constant (high frequency)

Here, the switching time exists between an ON state and an OFF state of the power transistor. Accordingly, transistor voltage VCE, transistor current IC, and power transistor loss PD (=VCE×IC) vary as shown in FIG. 5. FIG. 5 is a time chart showing varying states of the transistor voltage VCE, transistor current IC, and power transistor loss PD in response to the ON and OFF states of the power transistor Tr when the PWM frequency is constant (high frequency). In FIG. 5, a solid line indicates the case of a high duty ratio and a broken line indicates the case of a low duty ratio.

The power transistor loss PD is larger in the case of a high duty ratio Du (e.g. duty ratio 80%) than in the case of a low duty ratio Du (e.g. duty ratio 20%). This is because the power transistor loss PD is the sum of switching loss PDsw and ON loss PDon and both the switching loss PDsw and the ON loss PDon become larger as the duty ratio Du is higher. A general pump controller is therefore designed to radiate or release heat of the power transistor in order to prevent any problems due to a high duty ratio Du. Specifically, a heat sink that can radiate heat sufficiently or another heat-radiation means is provided.

In the present embodiment, on the other hand, the control section 21 of the pump controller 20 controls to change the frequency of PWM control signal to drive the transistor Tr. To be concrete, the PWM frequency f is changed to be low (e.g. PWM frequency: about 10 kHz) for a high duty ratio Du (e.g. duty ratio: about 80%), while the PWM frequency f is changed to be high (e.g. PWM frequency: about 20 kHz) for a low duty ratio Du (e.g. duty ratio: about 20%). Thus, the power transistor loss PD can be reduced when the duty ratio Du is high.

Figure 6:
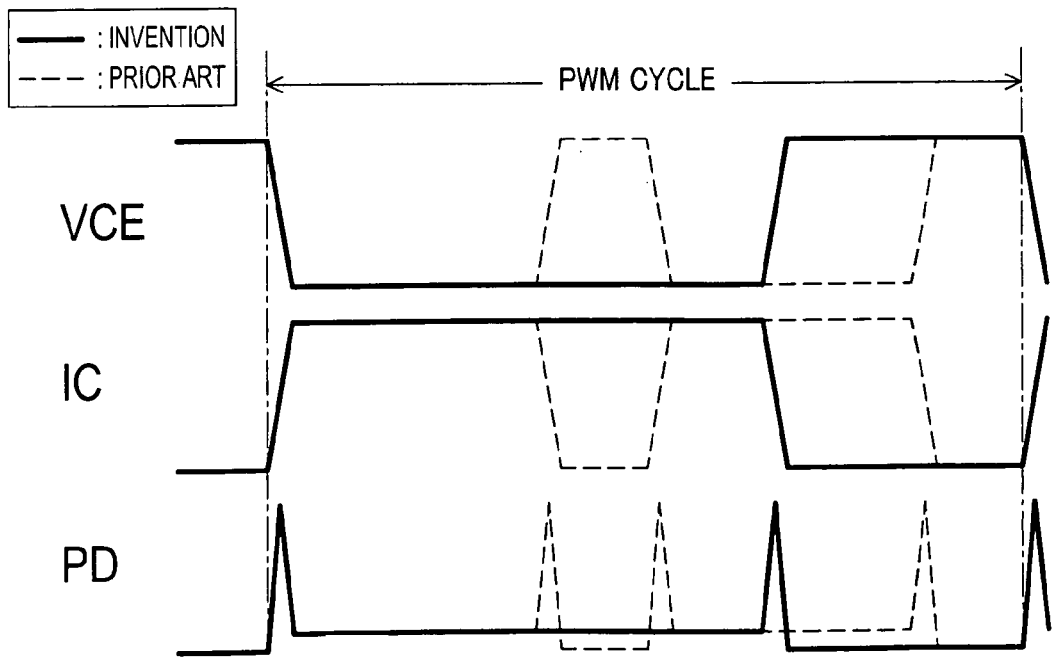
FIG. 6 is a time chart showing comparison in variations in transistor voltage VCE, transistor current IC, and power transistor loss PD in response to ON/OFF of power transistors Tr of the present invention and a prior art in the case where the duty ratio Du is high.

Specifically, as shown in FIG. 6, the ON loss PDon of the transistor substantially remains unchanged, whereas the switching loss PDsw occurs with less frequency, thus largely decreasing. FIG. 6 is a time chart showing comparison in variations in transistor voltage VCE, transistor current IC, and power transistor loss PD in response to ON/OFF of power transistors Tr of the present embodiment and a prior art in the case where the duty ratio Du is high. In FIG. 6, a solid line indicates the case of the present embodiment and a broken line indicates the case of the prior art. Here, the ON loss PDon itself is a small loss, which has only small influence on the power transistor PD. On the other hand, the switching loss PDsw is a large loss, which has large influence on the power transistor PD. In reducing the power transistor loss PD, therefore, it is effective to reduce the switching loss PDsw. In the present embodiment, the PWM frequency f is set to be low when the duty ratio Du is large in order to reduce the switching loss PDsw. This makes it possible to restrain heat generation of the power transistor Tr and thus simplify the heat-radiation structure of the power transistor Tr.

If the frequency f of PWM control signal to drive the power transistor Tr is set to be low, the frequency f is liable to fall in an audible range, leading to a problem of pump noise. However, the control section 21 of the pump controller 20 sets the frequency f to change in inverse proportion to the duty ratio Du of the PWM control signal to drive the power transistor Tr. Consequently, in the case where the duty ratio Du of the PWM control signal is high, that is, the discharge flow rate from the fuel pump 16 is large and the engine is operated in a high load and high rotation speed state, it is when the frequency f of the PWM control signal to drive the power transistor Tr is set to be low, thus generating pump noise. Accordingly, the pump noise will be drowned out by engine sound and vehicle running sound and be unlikely to become problematic in practice. When the engine is operated in a low load and low rotation speed state, on the other hand, the frequency f of the PWM control signal to operate the power transistor Tr is set to be high, thus restraining pump noise. In the present embodiment, as mentioned above, the heat generation of the transistor Tr can be restrained and also the pump noise can be made nonproblematic in practice. No special countermeasure for heat radiation is therefore required for the pump controller 20, so that the heat-radiation structure of the pump controller 20 can be simplified.

Figure 7:
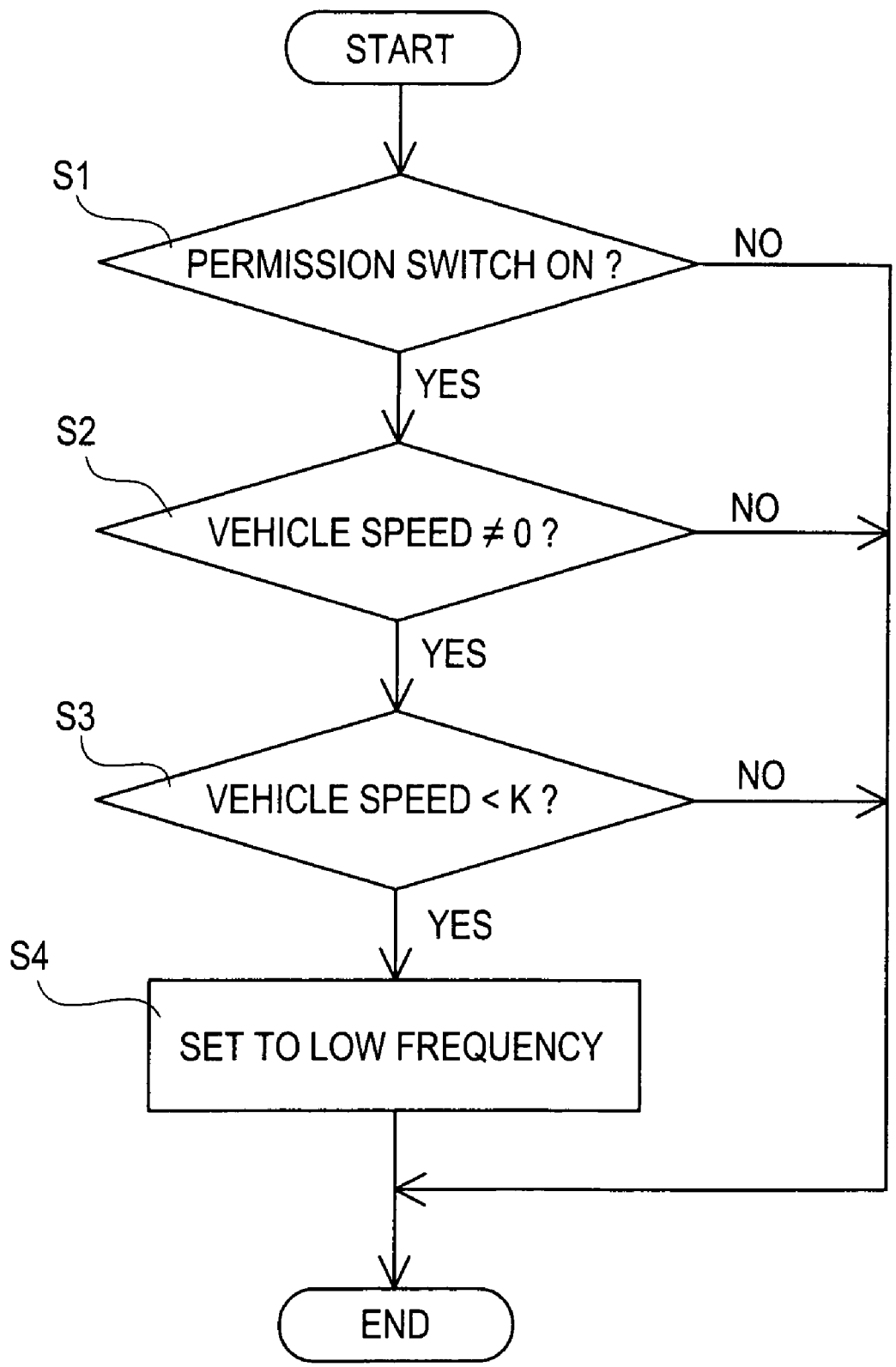
FIG. 7 is a flowchart showing the details of control for a fuel pump (a pump motor) to be executed by the pump controller during low-speed running or operation of a vehicle.

The control of the fuel pump 16 (the pump motor 19) during low-speed running of the vehicle will be explained below. This control is executed when the low-frequency setting permission switch 34 is turned ON. Thus, referring to FIG. 7, the following explanation is made on the details of control of the fuel pump 16 (the pump motor 19) to be executed by the pump controller 20 during the low-speed running. FIG. 7 is a flow chart showing the details of control of the fuel pump 16 (the pump motor 19) by the pump controller 20 during the low-speed running.

The control section 21 of the pump controller 20 first determines whether or not the low-frequency setting permission switch 34 has been turned ON (S1). If this switch 34 is ON (S1: YES), the processings in S2 to S4 are then executed as mentioned below. On the other hand, if the switch 34 is not ON (S1: NO), the current processing routine is terminated.

If the switch 34 is ON, the control section 21 of the pump controller 20 determines in S2 whether or not vehicle speed is zero based on a vehicle speed signal transmitted from the ECU 40. If it is determined that the vehicle speed is not zero (S2: YES), it is further judged in S3 whether or not the vehicle speed is lower than a predetermined speed K (e.g. about 20 km/h). If it is determined in S2 that the vehicle speed is zero (S2: NO), the current processing routine is terminated.

If it is determined in S3 that the vehicle speed is lower than the predetermined speed K (S3: YES), the control section 21 of the pump controller 20 sets, in S4, the frequency f of the PWM control signal to operate the power transistor Tr to a fixed low frequency (e.g. about 10 kHz; however, about 5 kHz is more preferable to make pump noise audible to persons (e.g. aged persons)) with reduced sensitivity to the higher frequencies. Accordingly, the pump noise is caused to occur from the fuel pump 16, that is, the pump noise is audible to the human ear. Thus, even a vehicle with low running noise generated by the fuel pump 16 allows a pedestrian or others to recognize the approach of a vehicle, without honking. As above, if the low-frequency setting permission switch 34 is not turned ON by a driver, the frequency f of the PWM control signal to operate the power transistor Tr is set at a high frequency (e.g. about 20 kHz), not set at a fixed low frequency, so that the pump noise from the fuel pump 16 does not occur (it is not audible to the human ear). Accordingly, if it is unnecessary to inform pedestrians or others of the approach of the vehicle even during low speed running (for example, when a driver puts the vehicle in the garage), the driver can concentrate the driving of the vehicle.

According to the fuel supply system 10 of the present embodiment as described above, the control section 21 of the pump controller 20 is arranged to change the frequency f of the PWM control signal to operate the power transistor Tr according to the duty ratio Du. That is, the PWM frequency f is set to be high when the duty ratio Du is low (when engine power is small). Thus, the loss PD of the power transistor Tr can be reduced when the duty ratio Du is high. Consequently, the heat generation of the power transistor Tr can be restrained, so that the heat-radiation structure of the power transistor Tr can be simplified.

When the duty ratio Du of the PWM control signal is high, that is, the discharge flow rate from the fuel pump 16 is large so that the engine is operated in a high load and high rotation speed state, the PWM frequency f is set to be low, thus generating pump noise. The pump noise is however drowned out by engine sound and vehicle running sound and will not be problematic in practice.

According to the fuel supply system 10 of the present embodiment, the heat generation from the transistor Tr can be restrained and the pump noise generated by the fuel pump 16 can be reduced to a practically nonproblematic level.

The aforementioned embodiment is a mere example and the present invention is not limited thereto. The present invention may be embodied in other specific forms without departing from the essential characteristics thereof. For instance, in the above embodiment, the present invention is applied to the control to drive the pump motor 19 of the fuel pump 16. Alternatively, the present invention may be applied to various types of motors such as a pump motor provided in a water pump and a pump motor provided in an oil pump as well as the pump motor provided in the fuel pump.

In the above embodiment, the present invention is applied to a hybrid electric vehicle in which an engine and an electric motor used in combination. Alternatively, the present invention can be applied to a vehicle using only an engine as a drive source, an electric vehicle using only an electric motor as a drive source, etc. In the case where the present invention is applied to the electric vehicle provided with no fuel pump, the present invention has to be applied to a motor-driven pump different from the fuel pump.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fluid pump control apparatus comprising:
   a main controller for controlling a vehicle drive source;
   a fluid pump internally provided with a motor to be PWM controlled based on a control signal from the main controller;
   a sub-controller for controlling supply of electric power to the motor of the fluid pump; and
   state detecting means for detecting an operating state of the vehicle drive source,
   wherein the sub-controller includes frequency control means for changing a frequency of the PWM control signal to control the fluid pump based on a detection result of the state detecting means, and
   the frequency control means controls to change the frequency of the PWM control signal to be gradually lower as output of the drive source detected by the state detecting means becomes larger and inversely to change the frequency of the PWM control signal to be gradually higher as the output of the drive source detected by the state detecting means becomes smaller,
   further comprising vehicle-speed detecting means for detecting vehicle running speed, and wherein the sub-controller causes the frequency control means to set the frequency of the PWM control signal to be lower than a predetermined value in an audible range when it is determined that the vehicle running speed detected by the vehicle-speed detecting means is larger than zero and smaller than the predetermined value, wherein the predetermined value of the running speed is 20 km/h or lower, wherein the predetermined value of the frequency in the audible range is 5000 Hz or lower.

2. The fluid pump control apparatus according to claim 1, wherein
   the vehicle drive source is a combination of an engine and an electric motor.

3. The fluid pump control apparatus according to claim 1, further comprising low-frequency setting permission means for permitting the frequency control means to set the frequency of the PWM control signal to be lower than the predetermined value, and
   wherein the sub-controller causes the frequency control means to set the frequency of the PWM control signal to be lower than the predetermined value in the audible range only if the low-frequency setting permission means permits setting of the PWM control signal to a low frequency.

* * * * *